March 28, 1933. G. M. WARD 1,902,925
SALES INDICATOR
Filed July 15, 1932 2 Sheets-Sheet 2
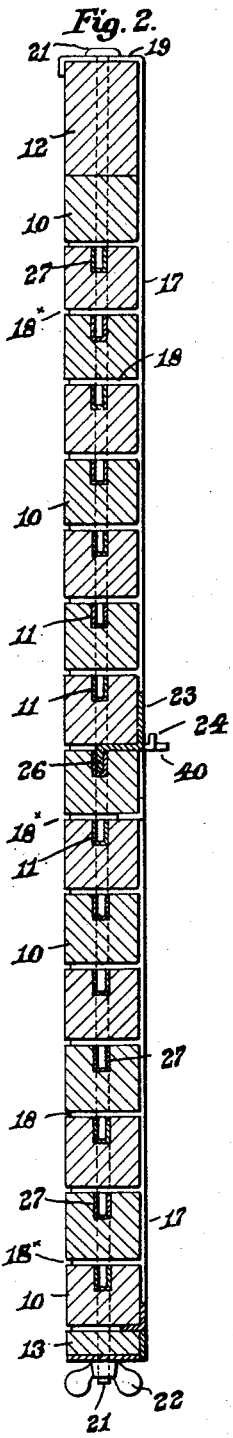
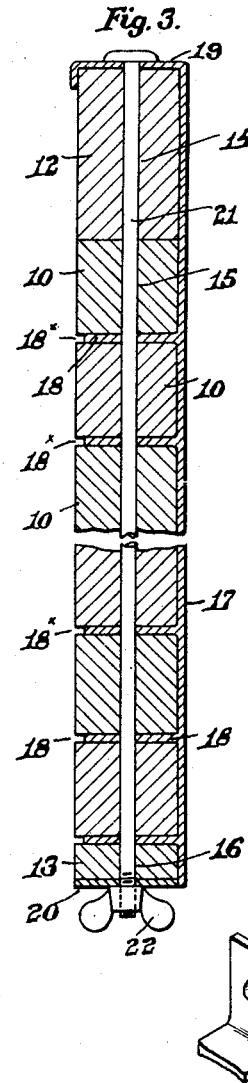
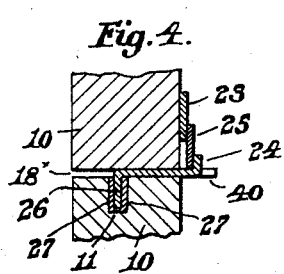
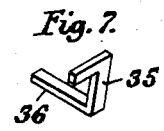
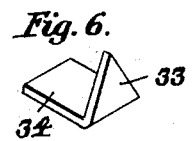
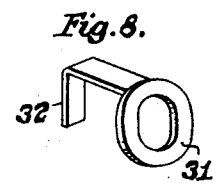
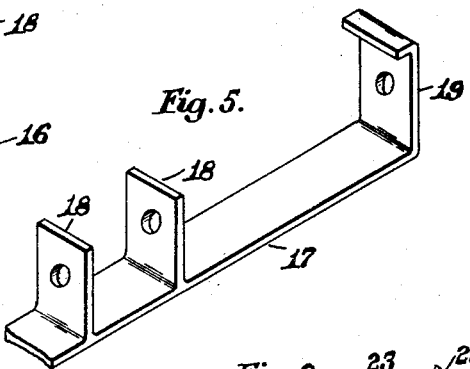
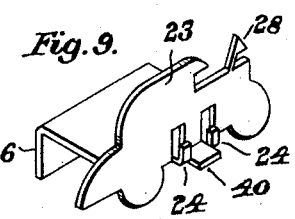
Inventor:
George M. Ward,
by Walter E. Lombard
Atty.

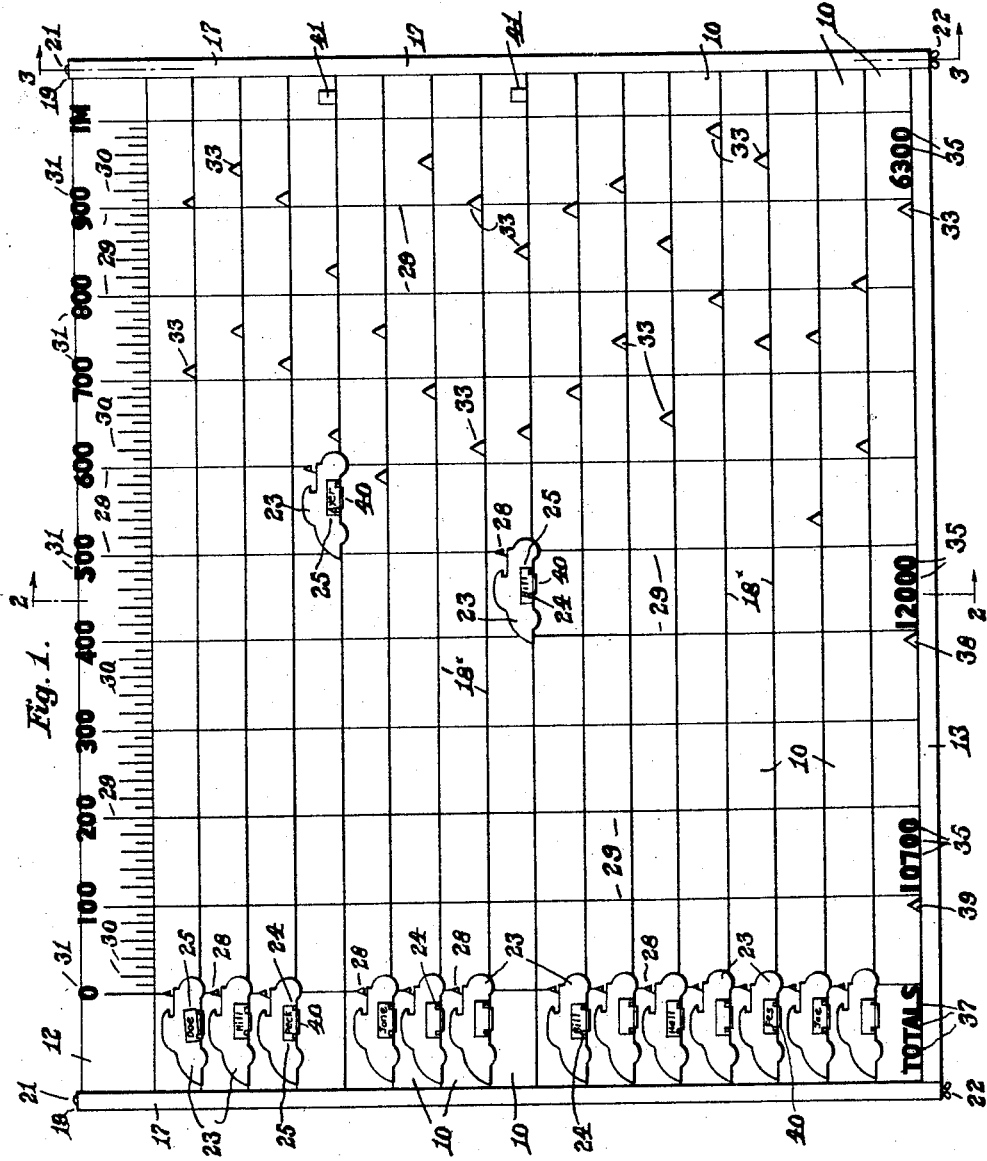

Patented Mar. 28, 1933

1,902,925

UNITED STATES PATENT OFFICE

GEORGE M. WARD, OF EAST WEYMOUTH, MASSACHUSETTS

SALES INDICATOR

Application filed July 15, 1932. Serial No. 622,585.

This invention relates to devices for indicating the progress of sales by any group of salesmen, the object being to create competition between the various salesmen by publicly displaying on a board the amount of sales made by each salesman at all times.

This object is attained by use of the device illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings:

Figure 1 represents a front elevation of a display board embodying the principles of the present invention.

Figure 2 represents a vertical section of same on line 2, 2, on Fig. 1.

Figure 3 represents a vertical section of a portion of the same, on line 3, 3, on Fig. 1.

Figure 4 represents a sectional detail to be hereinafter described.

Figure 5 represents a perspective of a portion of one of the end locking members.

Figure 6 represents a perspective of one of the removable pointers.

Figure 7 represents a perspective of one of the removable figures.

Figure 8 represents a perspective of one of the numerals adapted to be clamped to the scale of the board, and Figure 9 represents a perspective of one of the movable name plates used on said board.

Similar characters indicate like parts throughout the several figures of the drawings.

In the drawings, 10, 10, are a plurality of bars each having in the upper side face thereof a groove 11.

These bars 10 are parallel and above the upper bar is a scale 12 and below the lowest bar 10 is a narrow bar 13.

The opposite ends of the scale 12 have cylindrical holes 14 therein while the bars 10 have similar holes 15 therein alined with the holes 14 in the scale 12 and other holes 16 in the narrow bar 13.

Superimposed upon these bars 10, scale 12 and narrow bar 13 are strips 17 having flat sided projections 18 interposed between the various bars 10 and 13 to keep these elements in spaced relation to each other thereby forming slots 18x, as indicated in Figs. 2, 3 and 4, of the drawings.

Each strip 17 has a U-shaped upper end 19 straddling the upper side of the scale 12 and below the narrow bar 13 is a thin metal plate 20.

The scale 12, and all of the bars 10 and 13 are locked together by means of a headed bolt 21 extending through the U-shaped end 19, the holes 14, 15 and 16, projections 18 and plate 20, said bolt 21 having a clamping nut 22 at the lower end thereof, as indicated in Fig. 3 of the drawings.

When the scale 12, bars 10, 13, and plate 20 are locked together as described, a display board is provided on which movable elements are adapted to be mounted to obtain various forms of data.

As shown in the drawings, the board is arranged to indicate the extent of sales by various salesmen in the employ of a business firm.

This board is placed in a prominent position where the salesmen each day may see it and be informed of the standing of each salesman relatively to the standing of all other salesmen.

The object of the board is to create an incentive in each salesman to lead the race by obtaining the greatest amount of sales for any given period.

Each salesman is represented by means of a plate 23 in the form of a coupe, as shown in Figs. 1 and 9 of the drawings.

Each plate is of a distinctive color and is provided with ears 24 to receive a removable card 25 having the name of the salesman printed thereon.

Each plate is provided with an L-shaped extension 26, the end of which is disposed between metal side plates 27 in each groove 11.

These side plates 27 are for the purpose of permitting the plates 23 to be moved more readily along the slots 18x without wearing the face of the grooves 11 in the bars 10 which are preferably made of wood.

Each plate 23 is provided with a V-shaped projection 28 projecting upwardly from said plate.

The scale 12 has graduations therein forming ten major divisions 29, each major division being divided into ten subdivisions 30, as indicated in Fig. 1 of the drawings.

The major divisions 29 extend across all of the bars 10 as indicated in Fig. 1.

Coacting with the scale 12 and adapted to be clamped thereto are a plurality of numerals 31 having L-shaped extensions 32 adapted to extend over the top of the scale 12, thereby providing means for clamping these numerals to the scale in any desired position.

These numerals 31 may be clamped onto the scale 12 as indicated in Fig. 1, or they may be arranged in a different manner as desired according to the data which it is desired to display upon the board.

A plurality of pointers 33 of different colors are also provided, these pointers having flanges 34 adapted for insertion in the slots 18x.

These pointers 33 point toward the graduations in the scale 12 and the colors thereon indicate certain desired data.

For instance, as shown in the drawings the board is used to indicate the current sales by the various salesmen and the pointers 33 may be disposed in the slots 18x with one color indicating the point reached by each salesman during the previous month and another color indicating the point reached by the same salesman for an earlier month.

In the drawings, see Fig. 1, only two of these pointers are shown in connection with each salesman but if desired a greater number of pointers may be used.

Each day the plates 23 are moved along the slots 18x to indicate the amount of current sales of each salesman, the projection 28 pointing towards the graduations 29, 30 of the scale 12 to indicate the exact amount of sales made.

When the salesmen arrive each morning and consult the sales indicator, the board will show each salesman the amount of his sales relatively to the amount of sales of other salesmen.

If he finds on consulting the board he is a little behind the leader, there will be an incentive for him to increase his sales in order to pass the leader.

Moreover, the pointers 33 indicate the amount of sales for the previous month and some earlier month and there will be an incentive for the salesmen to at least reach the amount of sales made by him during these previous months.

In other words, the use of the display board will be a great incentive for all of the salesmen to race for the leading position and by the position of the plates 23 on the board he will know at all times how much greater an increase of sales must be made by him in order to pass the leader.

In practical use this board has been found to be very beneficial in increasing the business of a firm using the same.

The board is also provided with a plurality of numerals 35 having extensions 36 adapted to be inserted in the lower slot 18x.

A plurality of letters 37 are also provided, each of which is provided with an extension 36 to be disposed in the lower slot 18x.

These letters and numbers may be arranged as shown in Fig. 1 so that the figures at the right of Fig. 1 will indicate the total sales by all salesmen for each day, while the figures at the left of Fig. 1 will indicate the desired quota of sales to be reached by all salesmen, the central group of figures indicating the total sales reached in the previous year. By comparing these grand totals the salesmen will see what amount of sales must be made to reach the desired quota and how the sales compare with the record of the previous year. The total at right of Fig. 1 is changed daily.

Extending from the lower edge of each plate 23 is a projection 40 to represent the step of the coupe and which may be used to move the coupe along the slot 18x.

Square colored indicators 41 are also used to be positioned in the right hand end of the slots 18x when any salesman has passed the last graduation of the scale, after which the coupe will be returned to its original position at the left of the board and the coupe will then be moved along the slot 18x to indicate the additional sales over those indicated by the last graduation.

While in the drawings the separators 18 are shown as part of the plate 17, it is obvious that these separators may be used detached from said plate.

The numerals 31 used on the scale are interchangeable so they have unlimited numerical range whether based on percentage, dozens, units or some other data.

The coupes 23 are of metal and enameled and each bears a salesman's name on a card 25 supported on said coupe.

It is obvious by the use of this display board the current sales totals are always indicated and show the relative standing of the various salesmen.

By the use of the colored triangle pointers comparison is made with the past sales of each salesman and the progress toward the desired quota is readily seen.

These triangle pointers may also be used to indicate the sales of particular items while the progress of the coupes along the slots 18x will indicate the total of general business.

By the use of the board all essentials of individual and group sales effort are on display for quick reference and the board will keep the entire sales force at all times at contest pitch.

While the board as shown is for use in creating a contest in salesmanship it is quite obvious that the same board may be used for quite a varity of purposes in order to display any desired data.

It is believed that the operation and many advantages of the invention will be understood without further description.

Having thus described my invention, I claim:

1. A board provided with a plurality of parallel slots; a name plate movably mounted in each slot; a graduated scale above and parallel with said slots; a plurality of movable pointers adapted to be positioned in said slots; and a plurality of clips provided with figures adapted to be clamped to said scale.

2. A board provided with a plurality of parallel slots; a name plate movably mounted in each slot; a graduated scale above and parallel with said slots; a plurality of movable pointers adapted to be positioned in said slots; and a plurality of movable figures having extensions adapted for insertion in one of said slots.

3. A board consisting of a plurality of bars spaced apart to form slots; means at the ends of said bars for retaining them in spaced relation; name plates movable lengthwise of said slots; a plurality of removable pointers adapted to be disposed in said slots at predetermined points; and a graduated scale above and parallel with said slots.

4. A board consisting of a plurality of bars spaced apart to form slots, each bar having a groove in a side face thereof; means at the ends of said bars for retaining them in spaced relation; name plates movable lengthwise of said slots, each plate having an L-shaped extension the end of which is disposed in one of said grooves; a plurality of removable pointers adapted to be disposed in said slots and a graduated scale above and parallel with said slots.

5. A board provided with a plurality of parallel slots; a name plate movably mounted in each slot, each plate having ears bent therefrom to position a removable card; a graduated scale above and parallel with said slots; and a plurality of movable pointers adapted to be positioned in said slots.

6. A board consisting of a plurality of bars spaced apart to form slots; means at the ends of said bars for retaining them in spaced relation; name plates movable lengthwise of said slots; a plurality of removable pointers adapted to be disposed in said slots; a graduated scale above and parallel with said slots; and metal strips at the ends of said bars having projections between said bars.

7. A board consisting of a plurality of bars spaced apart to form slots; name plates movable lengthwise of said slots; a plurality of removable pointers adapted to be disposed in said slots; a graduated scale above and parallel with said slots; metal strips at the ends of said bars having projections between said bars; and a locking member extending through said bars and projections.

8. A board consisting of a plurality of bars spaced apart to form slots, each bar having a groove in its upper face; metal side plates in said grooves; means at the ends of said bars for retaining them in spaced relation; name plates movable lengthwise of said slots and each having an L-shaped projection, the end of which is disposed between the side plates of one of said grooves; a plurality of removable pointers adapted to be disposed in said slots; and a graduated scale above and parallel with said slots.

9. A board provided with a plurality of parallel slots; a name plate in the form of a coupe movably mounted in each slot and having a V-shaped projection; a graduated scale above and parallel with said slots; and a plurality of movable pointers adapted to be positioned in said slots.

10. A board provided with a plurality of parallel slots; a name plate movably mounted in each slot; a graduated scale above and parallel with said slots; a plurality of movable pointers adapted to be poistioned in said slots; and a plurality of U-shaped clips provided with figures adapted to be clamped to said scale above the graduations thereof.

11. A board provided with a plurality of parallel slots; a name plate movably mounted in each slot; a graduated scale above and parallel with said slots; a plurality of movable pointers adapted to be positioned in said slots; and a plurality of removable figures and letters having extensions adapted for insertion in the lowest slot.

12. A board provided with a graduated scale at its upper end; name plates movable in paths parallel with said scale and each having a V-shaped projection pointing toward said scale; and a plurality of removable pointers adapted to be disposed in said slots at predetermined points.

13. A board consisting of a plurality of bars spaced apart to form slots, each bar having a groove in the upper face thereof extending lengthwise thereof; means at the ends of said bars for retaining them in spaced relation; name plates movable lengthwise of said slots, each plate having an L-shaped extension the end of which is disposed in one of said grooves; a plurality of removable pointers adapted to be disposed in said slots; and a graduated scale above and parallel with said slots.

14. A board provided with a plurality of parallel slots; a name plate movably mounted in each slot, each plate having ears bent therefrom to position a removable card; a graduated scale above and parallel with said slots; and a plurality of movable V-shaped pointers of different colors adapted to be positioned in said slots at predetermined points.

15. A board provided with a plurality of parallel slots; name plates movable lengthwise of said slots; a plurality of removable pointers adapted to be disposed in said slots at predetermined points; a graduated scale above and parallel with said slots; and removable figures adapted to be clamped to said scale above the graduations thereof.

16. A board provided with a plurality of parallel slots; a name plate movably mounted in each slot, each plate having a V-shaped projection formed thereon; a graduated scale above and parallel with said slots; and a plurality of movable pointers adapted to be positioned in said slots at predetermined points.

Signed by me at 294 Washington St., Boston, Massachusetts, this 14th day of July, 1932.

GEORGE M. WARD.